May 29, 1928.

A. L. DE LEEUW 1,671,353

MACHINE FOR FORMING CYLINDRICAL CAMS

Filed April 2, 1926   4 Sheets-Sheet 2

Inventor
Adolph L. De Leeuw
By   Attorney
Albert F. Nathan

May 29, 1928.
A. L. DE LEEUW
1,671,353
MACHINE FOR FORMING CYLINDRICAL CAMS
Filed April 2, 1926 4 Sheets-Sheet 3
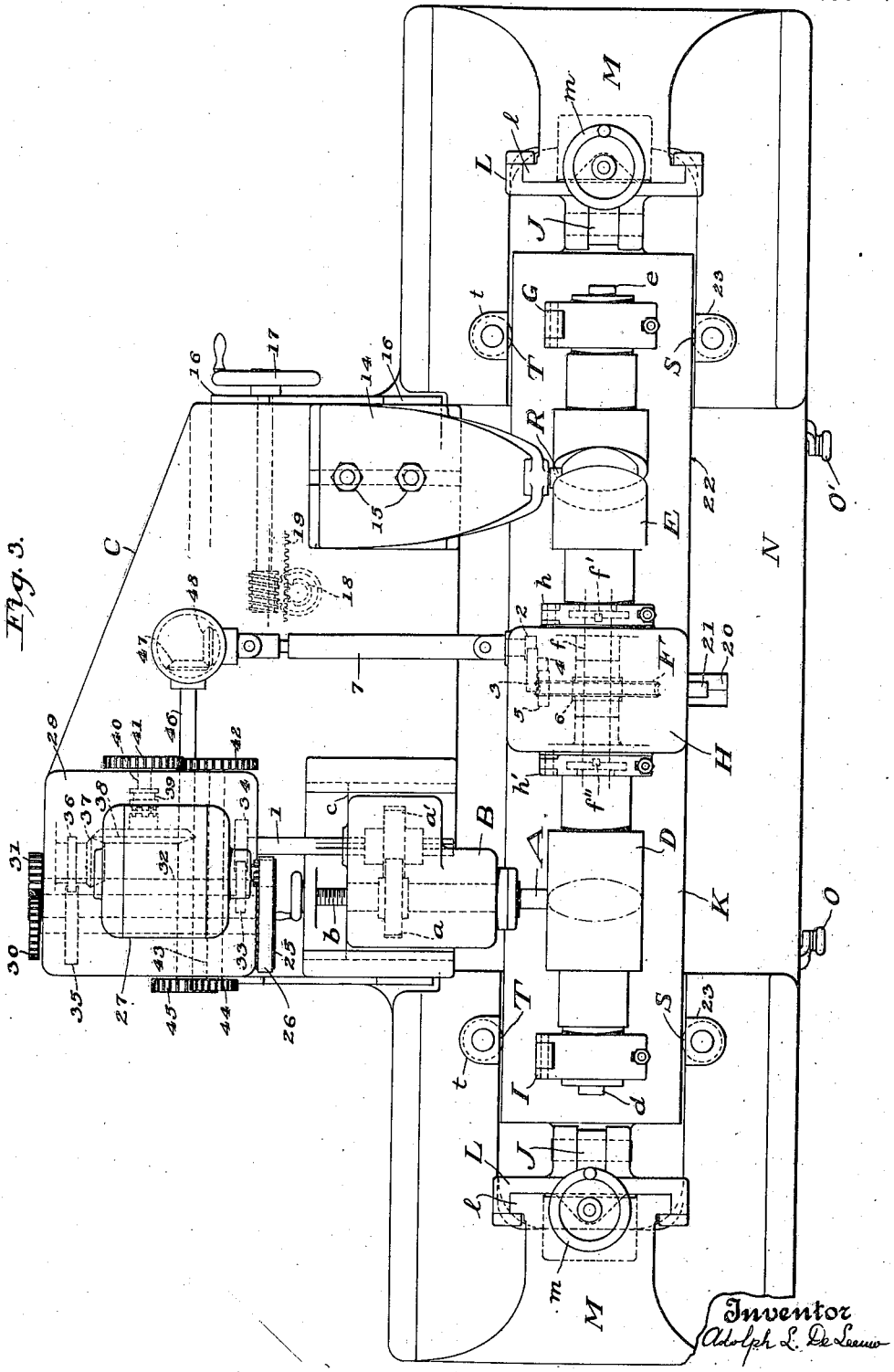
Inventor
Adolph L. DeLeeuw
By Attorney
Albert F. Nathan May 29, 1928.
A. L. DE LEEUW
1,671,353
MACHINE FOR FORMING CYLINDRICAL CAMS
Filed April 2, 1926      4 Sheets-Sheet 4
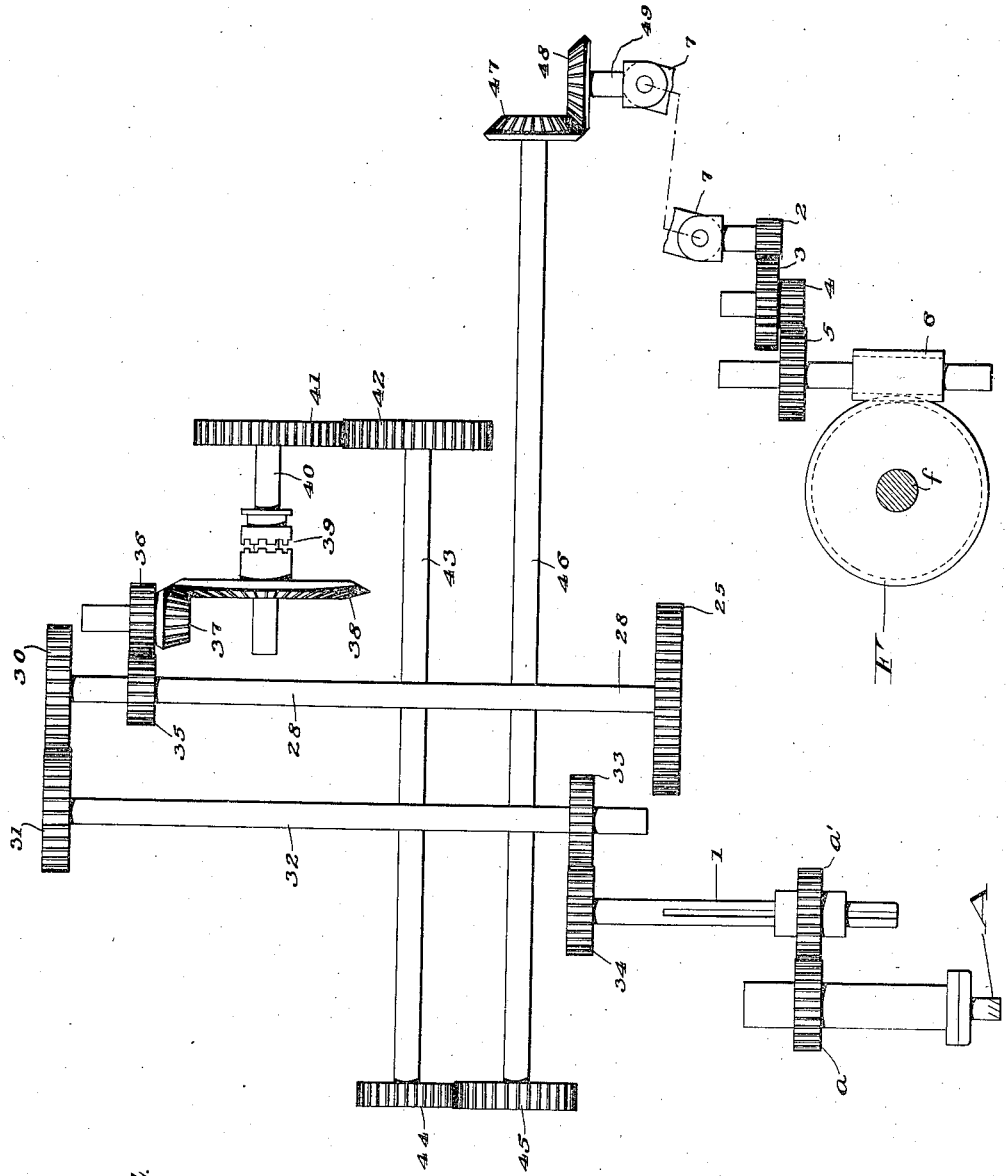

Patented May 29, 1928.

1,671,353

UNITED STATES PATENT OFFICE.

ADOLPH L. DE LEEUW, OF PLAINFIELD, NEW JERSEY, ASSIGNOR TO STOKES & SMITH COMPANY, OF PHILADELPHIA, PENNSYLVANIA, A CORPORATION OF PENNSYLVANIA.

MACHINE FOR FORMING CYLINDRICAL CAMS.

Application filed April 2, 1926. Serial No. 99,226.

This invention embraces a method and an apparatus for so forming cylindrical cams that they will uniformly interfit with a follower movable in an arcuate path.

Cylindrical cams have habitually been cut with the similar elemental points of their grooves at an invariable distance from the axis of rotation of the cam. Or, considering it from another viewpoint, with their linear generants all radial. Where the follower is confined to a straight path parallel with that axis, a uniform fit is thereby procured. But where the follower, as so often is the case, oscillates about an external pivot, it has always been necessary, after cutting the groove in the prevailing manner, to expend much manual effort in altering local regions of the groove to eliminate tendencies of the follower to bind and cramp. These regions become apparent only after the follower and cam have been assembled and subjected to trial runs. And the corrections have to be made only by removing metal, which thus reduces the area of contact prescribed by the designer with the object of keeping low the subsequent wear.

It is now proposed, by this invention, so to cut the groove that all such incompatibilities will be initially avoided, and the follower will uniformly contact with the walls of the groove in all of its arcuate positions; thereby ensuring smooth action, accurate interfitting, and a minimum of wear in usage.

Since cams of various diameters are required, and since the followers may be mounted to swing about radii of different lengths, it is desirable that the machine for cutting the groove should be adjustable to meet these diverse conditions. It is also desirable that such a machine should be sturdy, simple, easily adjusted and manipulated, and capable of performing its machining operations smoothly and accurately. These are objectives of this invention; the attainment of which will become more apparent by reference to the annexed drawings which are largely diagrammatic in character.

Figure 1:
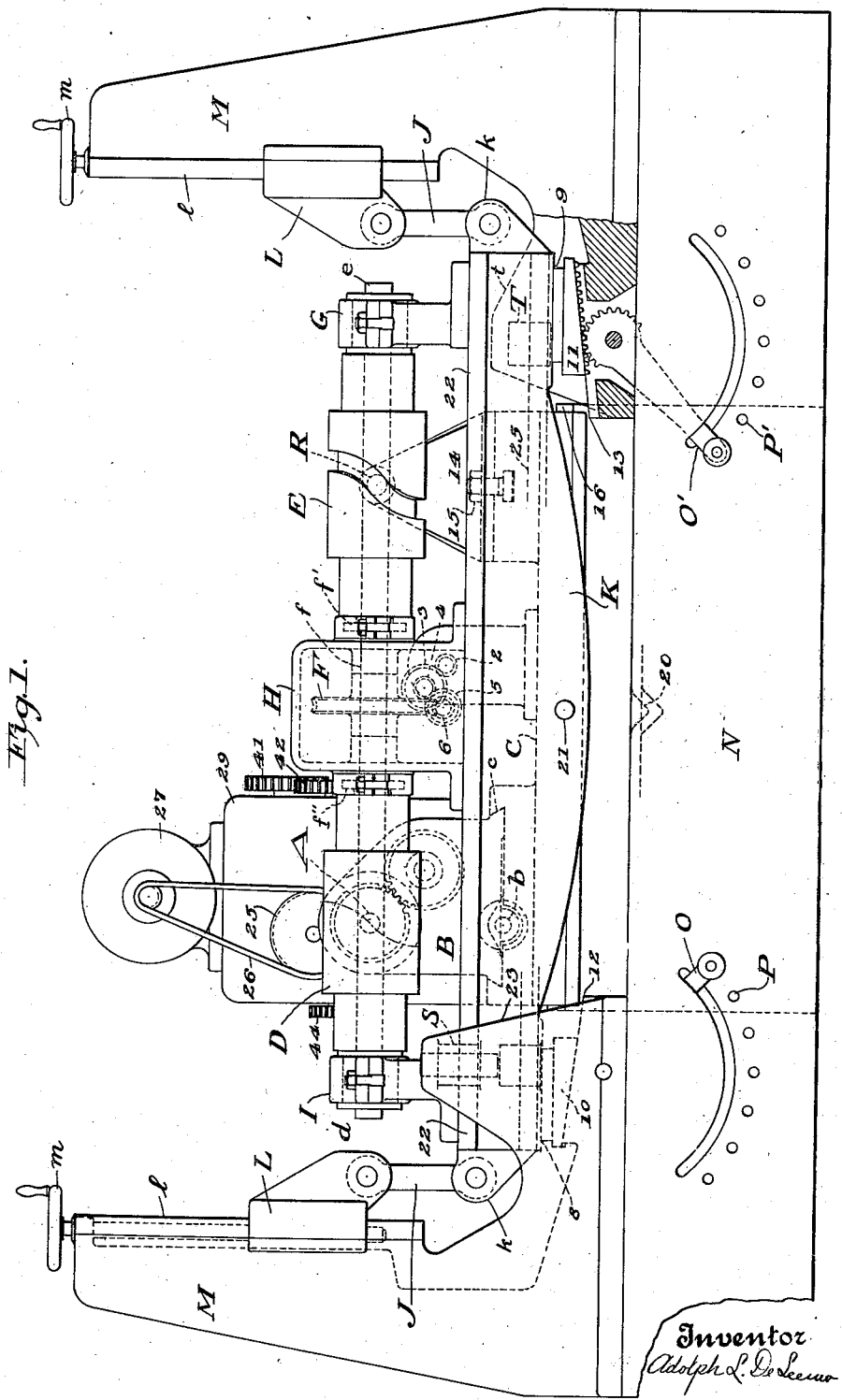
Figure 2:
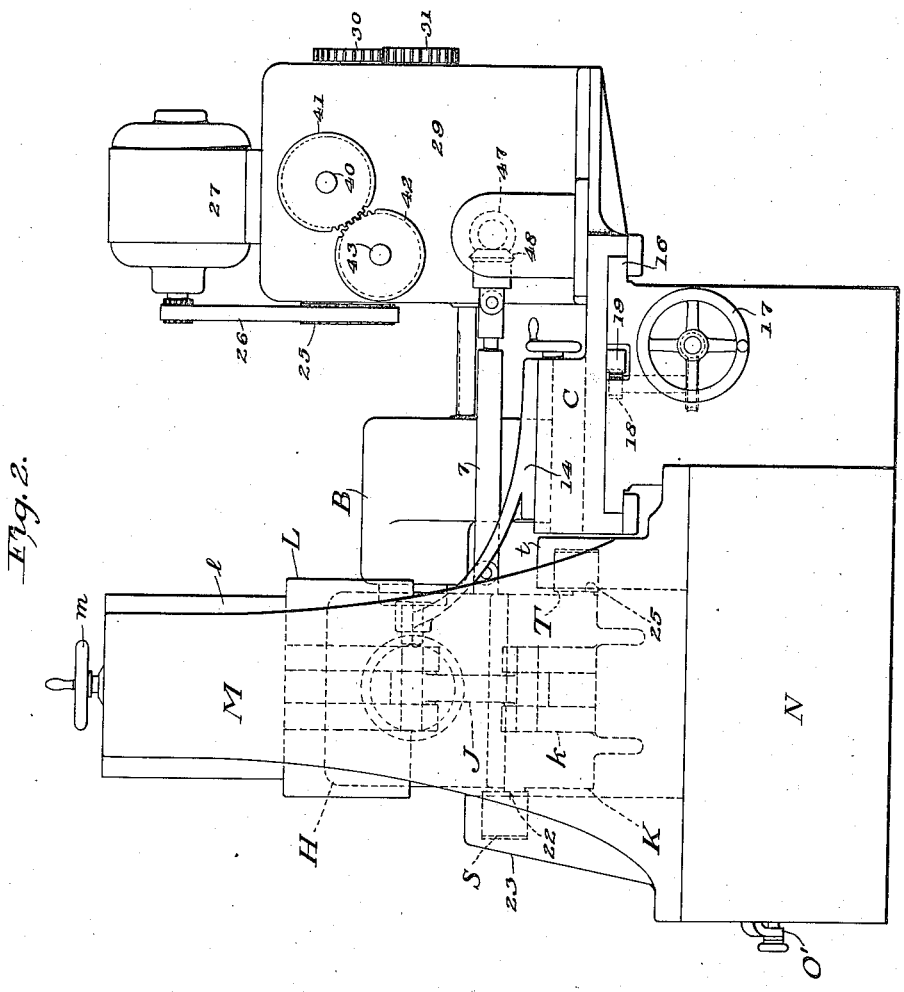

Figs. 1, 2 and 3 are a front elevation, an end elevation and plan, respectively, and Fig. 4 is a layout of the transmission.

If the intended follower should be replaced by an end-mill and moved in the manner intended for the follower, a groove would be formed which would be accurately conjugate to the follower in all of the latter's positions and there would be no cramping. But, it would be difficult to make a cam-cutting machine in that way and, at the same time, to make the machine readily adjustable to accommodate the variations in radii and angular swings required for the different followers that are needed in the arts.

I have, however, perceived that the above mentioned mechanical conflict (between the attainment in a single machine of an adequate range of adjustability and a capacity for developing a geometrically correct cam-groove) may be overcome in an essentially practical way by resorting to a converse principle. That is to say, instead of attempting to cause the milling-cutter to duplicate the movement intended for the follower, it may be mounted rigidly and the cam-blank itself will be bodily swung throughout the tooling operation; the nature of that swing being such as to preserve the relative movement intended between the cam and follower. In so doing, the cam will simultaneously be rotated about its axis so that its composite motion (during the cutting of the groove) will be a resultant of both the normal motion assigned to the follower and its own normal rotion, but when the cam is completed and subsequently assembled with its follower, each element will pursue the absolute motion assigned to it.

The end-mill or other appropriate cutter is indicated diagrammatically by A; it being appropriately mounted on a spindle journaled in any desirable head B slidably mounted in ways $c$ of a frame element C. The screw $b$ serves to shift the head B towards and away from the cam blank and the cutter is power driven, for example, by a suitable gear $a$ deriving motion from a gear such as $a'$ splined to a transmission shaft 1 which in turn is driven in any appropriate manner such as will be described. In other words, the cutter is capable of being fed into the rotating blank until the cam groove or face has been cut to the required depth but, apart from this feed, it is stationary in space during the cutting cycles as will be understood from the following.

The cam-blank D, a master-cam E, and a common driving-element (such as a worm wheel F) are, in this explanatory embodiment, shown fastened to aligned arbors $d$ and $e$, which are coupled to the drive-element $f$ by couplings $f'$ and $f''$ so as all to rotate as a unit. Suitable spacing collars may of course be used. For convenience in occasionally mounting a different master-cam on its arbor, and for successively putting new cam-blanks on their arbor, the arbors $e$ and $d$ are supported at their ends in journal boxes G and $h$, and I and $h'$. These journal boxes preferably have readily displaceable caps, as shown, to facilitate the mounting and dismounting.

The drive-shaft $f$ is permanently journaled in a gear box H and is driven by a worm wheel F through a suitable train of gears 2, 3, 4 and 5 and a worm 6; this train deriving motion in any appropriate manner as through a universal shaft 7. These elements constitute the means for imparting rotation to the master-cam and simultaneously to the cam-blank during the operation of cutting the groove.

The arcuate movement of the cam blank (counterparting the arcuate movement of its cooperating follower) is derived by mounting the above described arbors and their journals on a table arranged to be given what is known as a curvilinear translation. This is here instanced as a swingable link-suspended table; the fixed pivots of the links being carried by adjustable supports and the lengths of the links being equal to the radius about which the follower (to be used subsequently with the cam) is intended to oscillate. This link-suspended carriage is indicated by K and, at each end, provides an ear $k$ receiving the floating pivot of whatever link J has been selected. The fixed pivots of those links are shown carried by shoes L which interfit with vertical slides $l$ in the uprights M resting on the bed N of the machine. Hand wheels $m$ and their screws serve to effect the raising and lowering of the shoes L during the preliminary setting-up of the machine for cutting a given cam; the purpose of this adjustment being to enable the axis of the milling cutter to be brought into the same relation with the axis of the cam that the follower will have when subsequently in use. It may here be explained that it is customary, in designing a cylindrical cam with its arcuate follower, to space the axis of the cam a distance from the fixed pivot of the follower such that the follower will swing cross the normal plane of its fixed pivot and will swing about as far on one side as the other. It may also be here noted that the distance between the fixed pivot of the follower and the axis of the cam is usually such that the ends of the arc of the follower will be as far to one side as the crown of the arc is to the other of the axial plane. Occasionally, however, the design is such that the follower swings mainly at one side of its normal plane and it may here be pointed out that this machine is equally adaptable for cutting either of such types of cylindrical cams.

With the object of insuring a smooth cutting during the machining operation, the table together with its arbors, etc., should be fairly massive so as to avoid undue deflection or spring and so as to tend to keep the parts well down on their bearings and aid the milling cutter in accomplishing its work; the blank being turned in such a direction that it moves down onto the upper side of the milling cutter. This has the advantage of relieving the link pins of much of the pressure that would otherwise be imposed upon them during the cutting.

To aid in initially positioning this heavy table, preparatory to inserting the links having the lengths described for the particular operation, in hand it is recommended that the under extremities of the table be provided with flats 8 and 9 adapted, temporarily, to rest upon wedge blocks 10 and 11 which, in turn, are slidably supported on inclined slideways 12 and 13. Hand levers O and O′ may have a rack and pinion engagement with these wedge blocks to enable them to be readily shifted into and out of position; the extremity of each lever preferably having a conventional thrust or index pin adapted to enter any one of a series of holes P and P′ provided by the bed N of the machine so as to hold the levers against movement while the wedge blocks are supporting the table and to enable both levers to be set alike to compel each end of the table to have the same elevation.

Let it be desired to set up the machine for cutting a cam for a follower having a radius of say 6″. The appropriate master-cam will be inserted and likewise the cam-blank. The hand wheels $m$ will then be turned to raise or lower the table until the axis of the cutter is in the same relation to the axis of the blank that the follower will subsequently have with relation to the axis of the cam. When this elevation has been attained, the levers O and O′ will be moved until the wedge blocks 10 and 11 are snugly in place. The hand wheels may then let down the carriage a few thousandths. The pins for the links can then be freely removed and the new links are then substituted; the shoes L being of course moved up and down sufficiently to accommodate the length of the new links. After those links have been substituted, the lifting strain is taken up by turning the hand wheels $m$ sufficiently to enable the wedge blocks to be disengaged.

To oscillate the carriage during the machining operation, there is provided a stationary roller or stud R supported in a head 14 which is adjustably clamped (by bolts 15) to a frame element C previously mentioned. This frame element is, preferably, longitudinally slidable on the bed along ways 16, said movement being accomplished by means of a hand wheel 17 and a worm and worm wheel for turning a pinion 18 which engages a rack 19. This enables the stationary roller R (and simultaneously the milling cutter A) to be side-shifted until the roller R is aligned with and ready for insertion into the groove of the master-cam. Sometimes the cams have several grooves and this sliding construction enables the fixed roller to be brought into the next groove for positioning the milling cutter for its next groove, etc.

Occasionally a cam is to be cut where the follower swings chiefly on one side of its centre and, in that case, it may be necessary to swing the table considerably to one side before the stationary roller R can be inserted in the groove of the master cam. In that event, the end of a lever bar is inserted in a notch 20 in the bed N and brought to bear against projecting pin 21 provided by the table or carriage and thereby the carriage is swung to one side temporarily and the stationary roller R can be engaged with its groove.

To oppose the thrust of the milling cutter during the machining of the groove, the front of the table is provided with a flat-front bearing surface 22 which, at each end of the table, bears against a wide-face roller S journaled about an upright axis in a standard 23 rigid with the bed of a machine. This front bearing surface 22 is relatively high and the table has an opposing bearing surface 25 on its rear side which is relatively low; there being counterpart wide-face rollers T mounted in rear standards t. These rollers and bearing surface constitute a torque-resisting system which enables the table freely to swing under the action of the stationary roller R but without any ability to over-turn or be side-shifted by reason of the pressure of the milling cutter.

Any appropriate power transmission system may of course be incorporated in the machine. For example, a transmission system such as depicted by Fig. 4 can be employed; this consists of a main gear 25, deriving motion through a link-belt 26 from a motor 27, and actuating a shaft 28 which enters the gear box 29 mounted on the frame element C. At its protruding end, this shaft 28 carries a change gear 30 meshing with a pinion 31 on a shaft 32 which drives a pinion 33 meshing with gear 34 on the previously-described splined shaft 1. Thereby the cutter is driven.

To rotate the master-cam and the cam-blank, the previously described universal shaft 7 is driven by a train as follows:— Main shaft 28, pinions 35 and 36, bevel-gears 37 and 38, clutch 39, shaft 40, change-gears 41 and 42, shaft 43, change-gears 44 and 45, shaft 46, bevel-gears 47 and 48 and finally the shaft 49 connected to the universal shaft.

The advantage of providing two pairs of change-gears, instead of depending on a single pair is that unduly large gears are avoided and the attendant is spared mental effort in selecting the gears; it being necessary merely to select gears 44 and 45 for a ratio proportional to the diameter of the cam, and to select for gears 41 and 42 a ratio corresponding to the feed of the cutter in inches per minute. It may be observed that all the change-gears (including the pair 30 and 31 for the speed of the cutter) are arranged on the three immediately accessible sides of the transmission box W and, alongside of each pair, may be set a ratio-plate giving the sizes of gears for each ratio.

This machine has been shown more or less in diagrammatic form to render more manifest its cardinal characteristics, and it will be understood that they may be embodied and arranged in various ways supplemented by such refinements as may be dictated by good machine tool practise.

Having thus revealed this invention, I claim as new and desire to secure the following combinations and elements, or equivalents thereof, by Letters Patent of the United States:—

1. A cam-making method which consists in rotating a blank about its axis while in contact with a cutting tool held against lateral displacement and, during said rotation, imparting to said blank motions conforming to an arcuate translation to effect displacements of the axis of said blank with respect to said cutting tool in exact accordance with the character of the movement intended for the follower.

2. A method of cutting a cylindrical cam for a pivotal follower which consists in rotating a cam blank in contact with a cutter rotating about a fixed axis and simultaneously causing the cam blank to translate transversely to said axis in an arcuate path having the same radius as that of the follower.

3. A method for cutting a cylindrical cam for a pivotal follower which consists in uniformly rotating a cam-blank and, during said rotation, accomplishing a curvilinear translation of said cam blank in a plane transverse to the axis of the cutter and about centers the radial distance of which are equal to the radius of the follower.

4. A machine cutting a cylindrical cam comprising a table mounted for curvilinear translation; a master-cam and a cam-blank mounted to rotate synchronously about parallel axes; a stationary element cooperating with the groove of the master cam; and a non-shiftable cutter engaging the cam blank.

5. A machine for cutting a cylindrical cam combining a rock-table; guide means for holding said table in its longitudinal plane; links for determining the radius of the curvilinear translation of said table in its longitudinal plane; a master-cam and a cam-blank mounted on said table; a fixed stud engaging the groove of said master-cam; a non-shiftable cutter engaging the cam-blank, the axes of said stud and cutter being transverse to the plane of oscillation of said table; and means for synchronously rotating said cam and cam blank whereby said fixed stud may accomplish a curvilinear translation of said table.

6. A method of cutting a cylindrical cam for a pivotal follower which consists in rotating a cam blank downwardly against a fixed cutter, and simultaneously causing the cam blank to translate in an arcuate path having the same radius as that of the follower.

7. A cam cutting machine combining a fixed cutter; a rotatable arbor arranged transversely to the axis of said cutter; a support for said arbor; parallel links for carrying said support; and fixed pivots for said links, said fixed pivots being adjustable transversely to said axis.

8. A machine cutting a cylindrical cam comprising a table mounted for curvilinear translation; a master-cam and a cam-blank mounted to rotate coaxially; a stationary element cooperating with the groove of the master cam to effect longitudinal displacements thereof; a non-shiftable cutter engaging the cam blank; and means for rotating said cam-blank downwardly against said cutter.

9. A machine for cutting a cylindrical cam combining a rock table; guide means for holding said table in its longitudinal plane; detachable links for determining the radius of the curvilinear translation of said table in its longitudinal plane; a master-cam and a cam-blank mounted on said table; a fixed stud engaging the groove of said master-cam; a non-shiftable cutter engaging the cam-blank, the axes of said stud and cutter being transverse to the plane of oscillation of said table; temporary supports for carrying the weight of said table during a replacement of its links; and means for synchronously rotating said cam and cam blank whereby said fixed stud may accomplish a curvilinear translation of said table.

10. A cam cutting machine combining a fixed cutter; a rotatable arbor arranged transversely to the axis of said cutter; a table for said arbor; parallel links for supporting said table; and abutment members for resisting any tendency for the table to turn about its longitudinal axis.

11. A machine cutting a cylindrical cam comprising a table mounted for curvilinear translation; a master-cam and a cam-blank mounted thereon to rotate synchronously; a stationary stud cooperating with the groove of the master cam; a non-shiftable cutter cooperating with the cam-blank; and a laterally adjustable frame upon which said stud and cutter are mounted.

12. A machine for cutting a cylindrical cam combining a rock table; guide means for restraining said table to movement in a longitudinal plane; links for determining the rock-arc of said table in its longitudinal plane; a master-cam and a cam-blank mounted on said table; means for synchronously rotating said cam and cam blank whereby a fixed stud may accomplish a curvilinear translation of said table; a normally fixed stud engaging the groove of said master-cam; a non-shiftable cutter engaging the cam-blank, the axes of said stud and cutter being transverse to the plane of oscillation of said table; and a frame carrying said stud and cutter and adjustable laterally as a unit therewith, said stud and cutter being independently adjustable on said frame towards said cam and cam-blank.

13. A gear-driven mechanism comprising two independently variable sets of change-gears; the one set of change-gears being adapted especially to meet one variety of conditions, and the other set to meet another variety of conditions; and a transmission comprehending said two sets in serial relation, whereby conjointly they will transmit motion at a single resultant ratio conforming to both of said conditions.

In witness whereof, I have hereunto subscribed my name.

ADOLPH L. DE LEEUW.